(12) United States Patent
Lathrop

(10) Patent No.: US 6,666,149 B1
(45) Date of Patent: Dec. 23, 2003

(54) CONVEYANCE SHELF AND CONTAINER ATTACHMENT

(76) Inventor: Kim Nichols Lathrop, 7230 SE. Market St., Portland, OR (US) 97215

(*) Notice: Subject to any disclaimer, the term of this patent is extended or adjusted under 35 U.S.C. 154(b) by 0 days.

(21) Appl. No.: 09/474,931

(22) Filed: Dec. 29, 1999

(51) Int. Cl.⁷ .............................................. A47B 23/00
(52) U.S. Cl. ........................... 108/44; 108/47; 108/152
(58) Field of Search ............................. 108/44, 45, 46, 108/47, 42, 152

(56) References Cited

U.S. PATENT DOCUMENTS

| | | | | |
|---|---|---|---|---|
| 2,768,043 A | * | 10/1956 | Kristoff et al. ............... | 108/46 |
| 2,817,566 A | * | 12/1957 | Herman ..................... | 108/45 X |
| 3,386,392 A | * | 6/1968 | Gramm ....................... | 108/44 |
| 4,620,488 A | * | 11/1986 | Formo ......................... | 108/46 |
| 5,108,000 A | | 4/1992 | Stoll et al. | |
| 5,148,755 A | * | 9/1992 | Morales ..................... | 108/46 X |
| 5,386,785 A | * | 2/1995 | Naor ........................... | 108/44 |
| 5,558,026 A | * | 9/1996 | Seibert ........................ | 108/44 |
| 5,593,025 A | | 1/1997 | Feibelman | |
| 5,953,999 A | * | 9/1999 | Kanehl ........................ | 108/44 |

* cited by examiner

Primary Examiner—Jose V. Chen

(57) ABSTRACT

A seat back attachment for airline seats and the like, having a thin essentially rigid suspension card which slips between the seat back tray table and the back of the seat, and is sandwiched securely between said table and seat back when the tray table is secured in the upright storage position. The card is attached to a shelf or container dimensioned to be convenient to the use of a passenger. A seat back compensation structure adjusts the shelf or container to maintain a roughly horizontal plane should the at back be reclined or raised.

13 Claims, 13 Drawing Sheets

CONVEYANCE SHELF AND CONTAINER ATTACHMENT

BACKGROUND OF THE INVENTION

This invention relates to suspended shelves and containers, specifically those for use by a passenger on a conveyance.

In the highly competitive world of airlines and to a lesser extent, other forms of mass transportation, efforts to maximize passenger capacity has resulted in the reduction of seat size and surrounding space for individual passengers.

Additionally, to match or underbid the fare pricing of competitors, and increase profits, cost cutting measures have often been directed at the food and beverage service normally served on these conveyances. Domestic airlines, for example, which once offered passengers meals on mid-length flights now do not.

This long felt, but unsolved need; simultaneously for sustenance and space by airline passengers was documented in the lead story of USA TODAY (Feb. 19th., 1999): "The 500 million passengers expected to board domestic flights this year are less likely to get an airline meal than at any time in modern commercial aviation history."

And: "Coupled with an expanding smorgasbord of affordable and portable airport food, meal shrinkage has triggered a boom in carry-on."

Nothing in the known prior art offers a solution similar to the invention about to be disclosed, namely the need for a means to provide for greater sustenance while preserving personal space on domestic conveyances.

U.S. Pat. No. 5,593,025 (Feibelman) teaches a foldable jewelry card: " . . . provided with a hook portion integrally formed along the upper edge of the rear panel . . . "

U.S. Pat No. 5,108,000 (Stoll et al.) teaches a caddy for recyclable paper with a hanging means for attachment to a waste receptacle described: " . . . loop segments define a support section projecting rearwardly from said rear wall and a depending engagement section to support and secure the caddy when the hanger member is hangingly mounted on the rim of a conventional wastebasket. . . ."

SUMMARY OF THE INVENTION

It is therefore, an object of this invention to provide a convenient means to hold small objects such as beverages and sandwiches at a location convenient to the reach of a seated airline or conveyance passenger while preserving more of the uncluttered space in front of him.

Another object of this invention is to provide a convenient means to transport objects useful to a passenger to the conveyance from a different location.

An additional object of this invention is to provide an embodiment which has a first space saving position for transport, and a second position for deployment Briefly, the invention is suspended from the seat back and the upper edge of the stored tray table directly in front of the seated passenger.

A means for securing the invention between the tray table and seat back consists of a thin essentially rigid suspension card attached at an upper portion of the invention facing the seat back. Beginning at the point of attachment to the remainder of the invention, the suspension card extends perpendicularly for a distance which corresponds to the thickness of the tray table, and then at a right angle down to a distal end.

The invention is positioned when the tray table is unlatched from the stored and secure position and opened slightly towards the deployed position. The downward portion of the suspension card slips over the tray table upper edge to engage the tray table surface. The tray table is then returned to the stored and secured position clamping the card between the inner surfaces of the tray table and seat back.

As will become further apparent, one of the novel aspects of this invention is that the suspension card assembly need not have sufficient rigidity to to fully support the invention and its contents in the suspended position. Rather, because the suspension card is held between the tray table and seat back, it need only have sufficient rigidity to keep from being pulled out past the right angle channel formed by the recessed seat back and the upper edge and surface of the tray table.

Thus other embodiments of the invention need satisfy only the structural means described above, and while the following suspension card assemblies satisfy said means, they are certainly not the only possible embodiments, but may include; one where portions of the suspension card are flexibly joined so that the card may be folded to a flattened position against the invention for storage, one in which the card is attached by arms so as to be retractable from a position of tray table engagement to a position of flat storage, and one in which the card is attached to the invention by a segment of flexible material which offers the additional advantage of accommodating tray tables of various thicknesses.

Attached to the suspension card assembly, the invention may be formed as a container to carry items such as food and beverages, or to hold drinks or other small items, such as reading lights.

A means is provided to permit repositioning of the invention in order to compensate for the change in incline if the passenger directly in front of the user reclines or raises his seat back. This means may take several forms, but in the case of the container embodiment it may be in the form of a U shaped extension bracket that straddles the bottom of the container on two sides and the back.

When the seat holding the invention is reclined, the invention may be repositioned to a more horizontal position by sliding the U shaped extension bracket towards the seat back. In the case of seat movement to the upright position, the U shaped extension would be withdrawn in the opposite direction.

A second embodiment of a repositioning means entails a first element of the invention attached to the suspension card assembly, and a second element which slip fits through the first portion at roughly a perpendicular angle, and which while having some resistance, can be urged manually by the user to change the angular position against the seat back, and therefore, compensate for seat back adjustment.

An additional feature of this two part embodiment is that it allows one element to be stored within the other for transport, thus minimizing both bulk and awkwardness for a passenger who usually has other carry on items as well.

The foregoing and other objects, features and advantages of the invention will become more readily apparent from the following detailed description of the preferred embodiments which proceeds with reference to the accompanying drawings.

DETAILED DESCRIPTION OF THE PREFERRED EMBODIMENTS

Figure 1:
FIG. 1 shows the close proximity front to back of airline passengers seated in th coach section on a domestic flight

Turning to the drawings, FIG. 1 shows the limited space available to passengers on a United States domestic airline.

Figure 2:
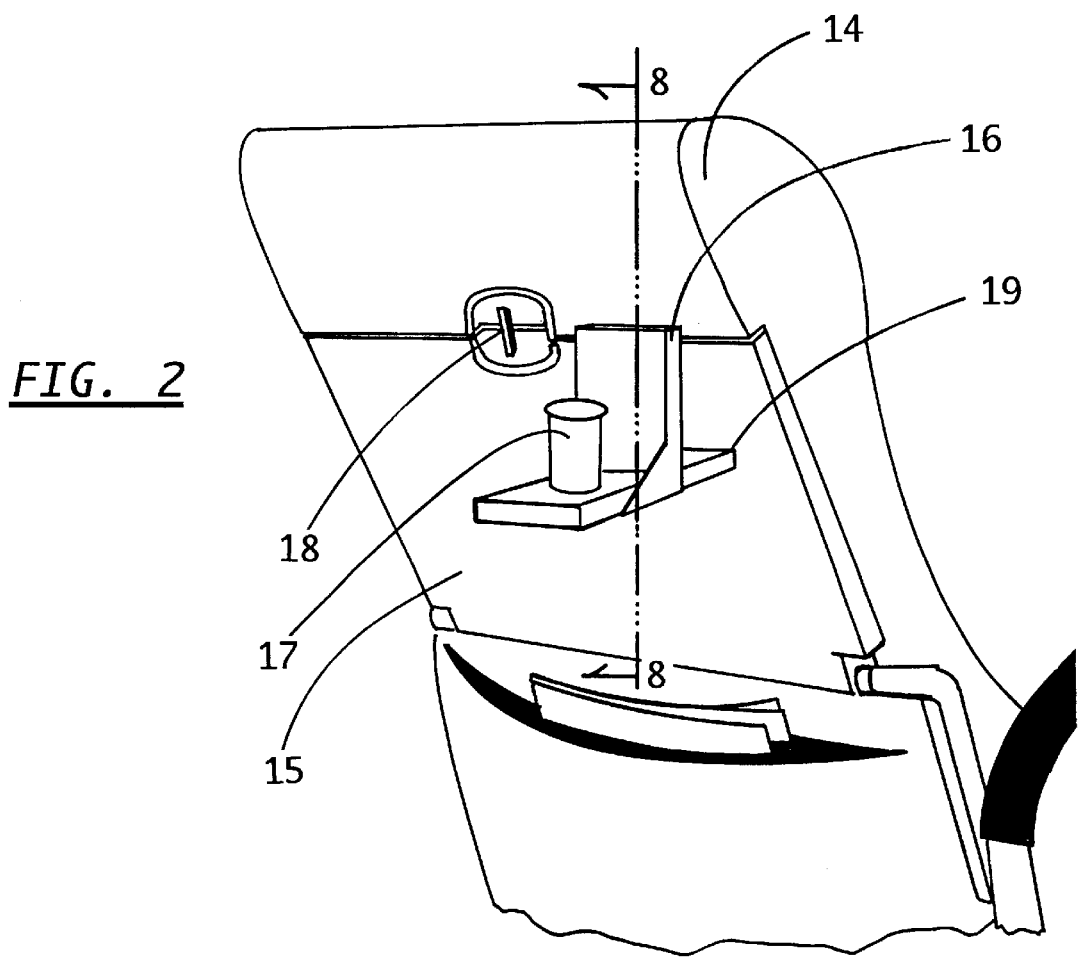
FIG. 2 shows a portion of a passenger seat back and tray table with one embodiment of the invention suspended from the upper edge of the tray table while said table is in the stored and secured position against the seat back.

FIG. 2 shows a portion of the seat back 14 and tray table 15 illustrated in FIG. 1 with one embodiment of the invention configured to hold a beverage cup 17 at a distance convenient to the reach of the passenger, with the invention attached at 16, and suspended from the upper edge of the tray table 15, when said table is held in the secured, stored position by latch 18 against the seat back 14. Another element of the invention 19, extends towards the stored tray table in order to compensate for angular change when the seat back is reclined.

Though not presently visible, a tray table-seat back suspension card assembly is attached to the invention's upper edge at the back. Line 8—8 indicates a portion of the tray table and seat back with the suspension card assembly components viewed sectionally in the direction indicated by the arrows.

Figure 8:
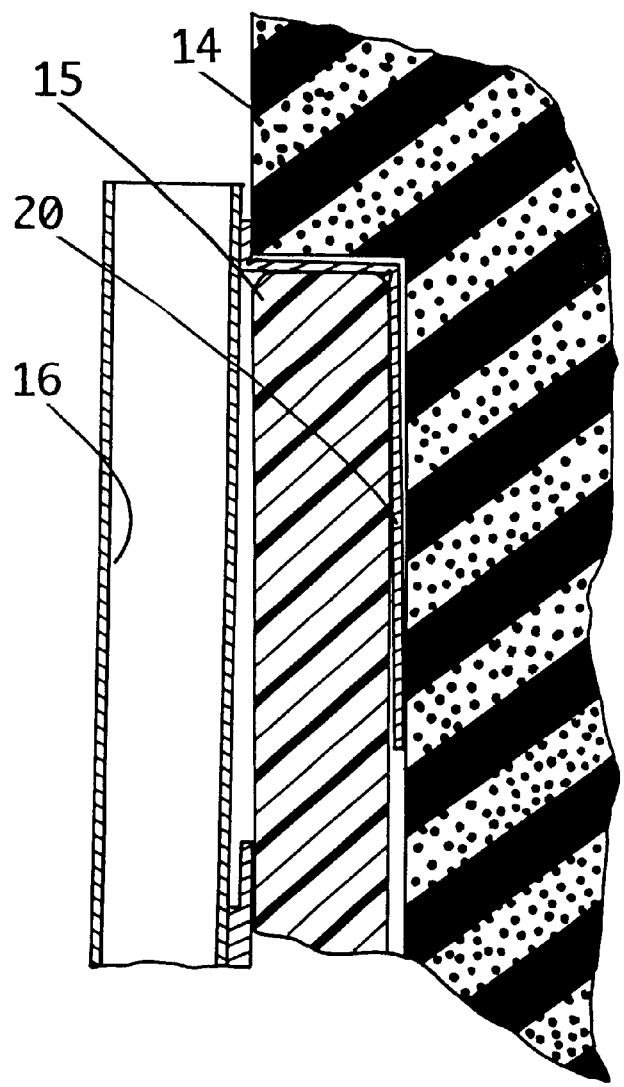
FIG 8 as shown in FIG. 7 with the invention in the deployed position suspended from the tray table when in the locked position against the seat back.

We now refer to FIG. 8 which is the above referenced sectional view. In this view the tray table-seat back suspension card 20 is held securely sandwiched between the seat back 14 and tray table 15. The remainder of the invention is suspended from the attached suspension card. The tray table securing latch 18, shown in FIG. 2. keeps the tray table, the suspension card and the seat back securely together.

A novel feature of the invention is that because the the seat back and tray table sandwiches the suspension card between them, the suspension card assembly need not be constructed rigidly, or with sufficient strength to support the invention in the suspended position independent of the tray table-seat back assembly.

Figure 7:
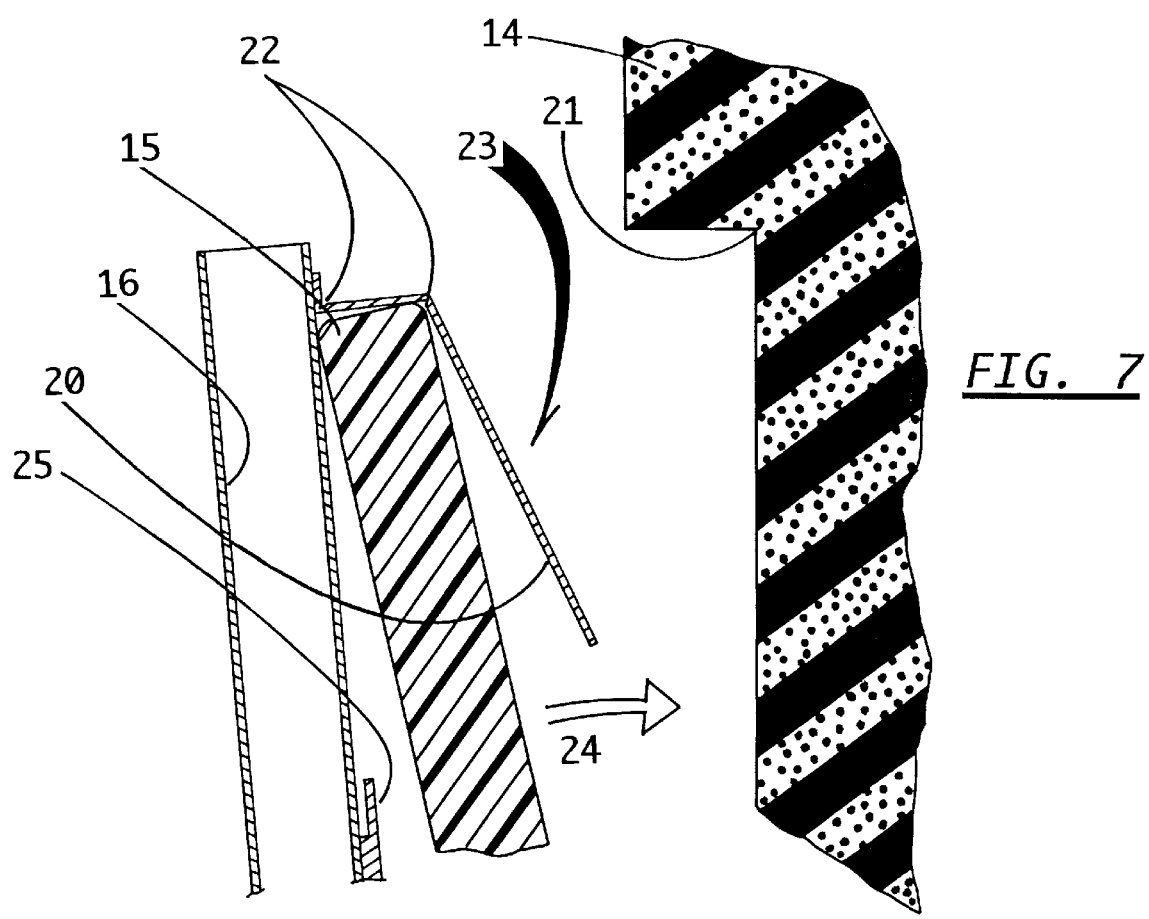
FIG. 7 is a view of portions of the passenger seat back and tray table as sectioned along line: 8—8. This figure demonstrates the method and sequence for the suspension of the invention from the upper edge of the tray table.

Indeed, the opposite is so, because of the commensal relationship with said assembly, the suspension card may be constructed of thin material, with rigidity sufficient only to prevent slippage past the angle point 21 shown in FIG. 7, formed when the tray table is in the stored, and locked position against the seat back.

Thus, as soon will become apparent, several embodiments may successfully attach the suspension card to the rest of the invention.

Directing attention again to FIG. 7, The invention is quickly attached at the upper edge of the partially opened tray table 15 by slipping the suspension card 20 over the top of the table edge as shown. Flexible angle points in the card at 22 allows the card to flexibly swing in a more open position and thus easily slip into position,over the tray table's upper edge and bend down in the direction of arrow 23, to engage the tray table when said table is returned to the closed and secured position shown in FIG. 8.

Figure 5:
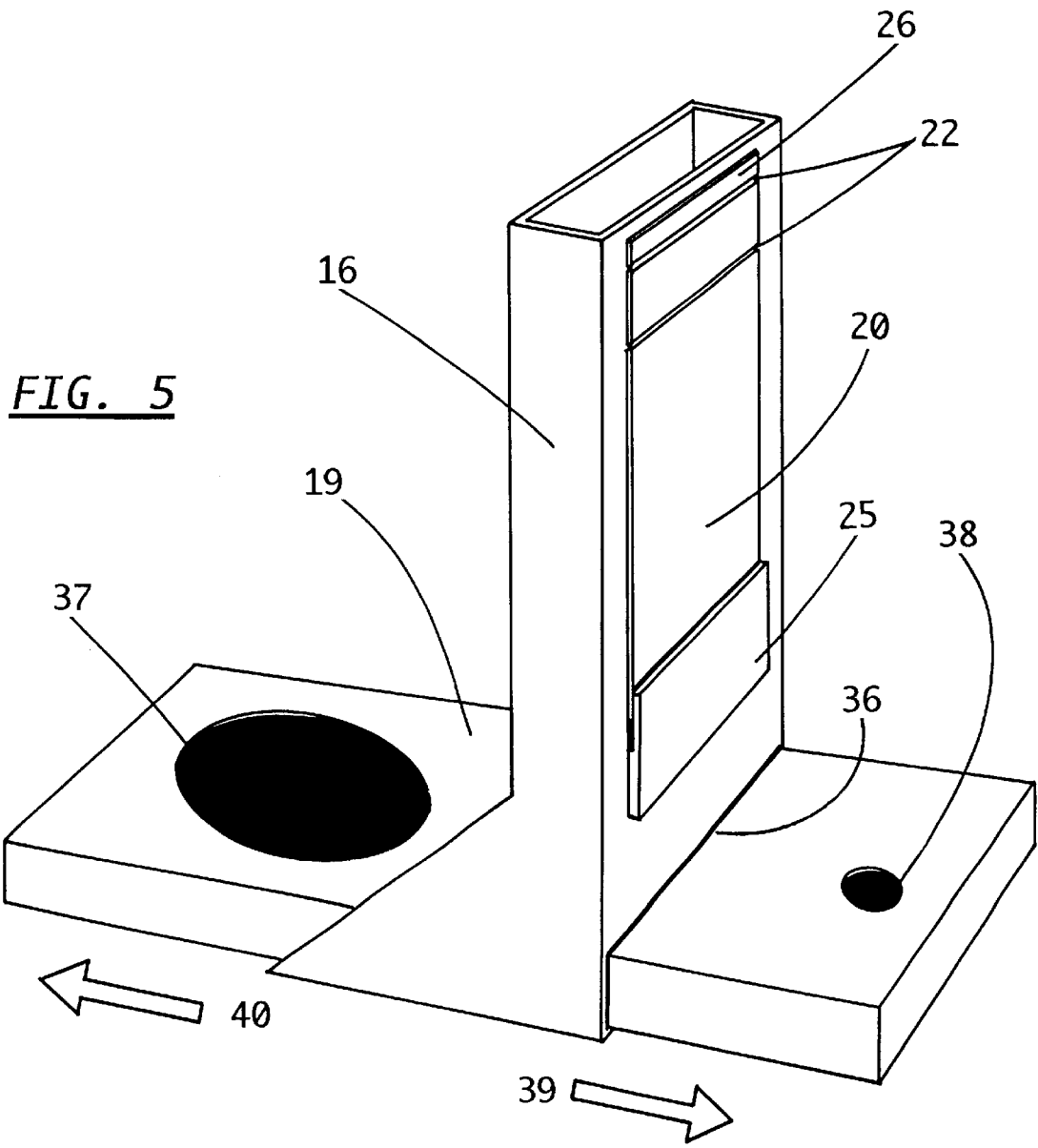
FIG. 5 is a side view of the embodiment in FIG. 3 positioned to show additional features.
Figure 6:
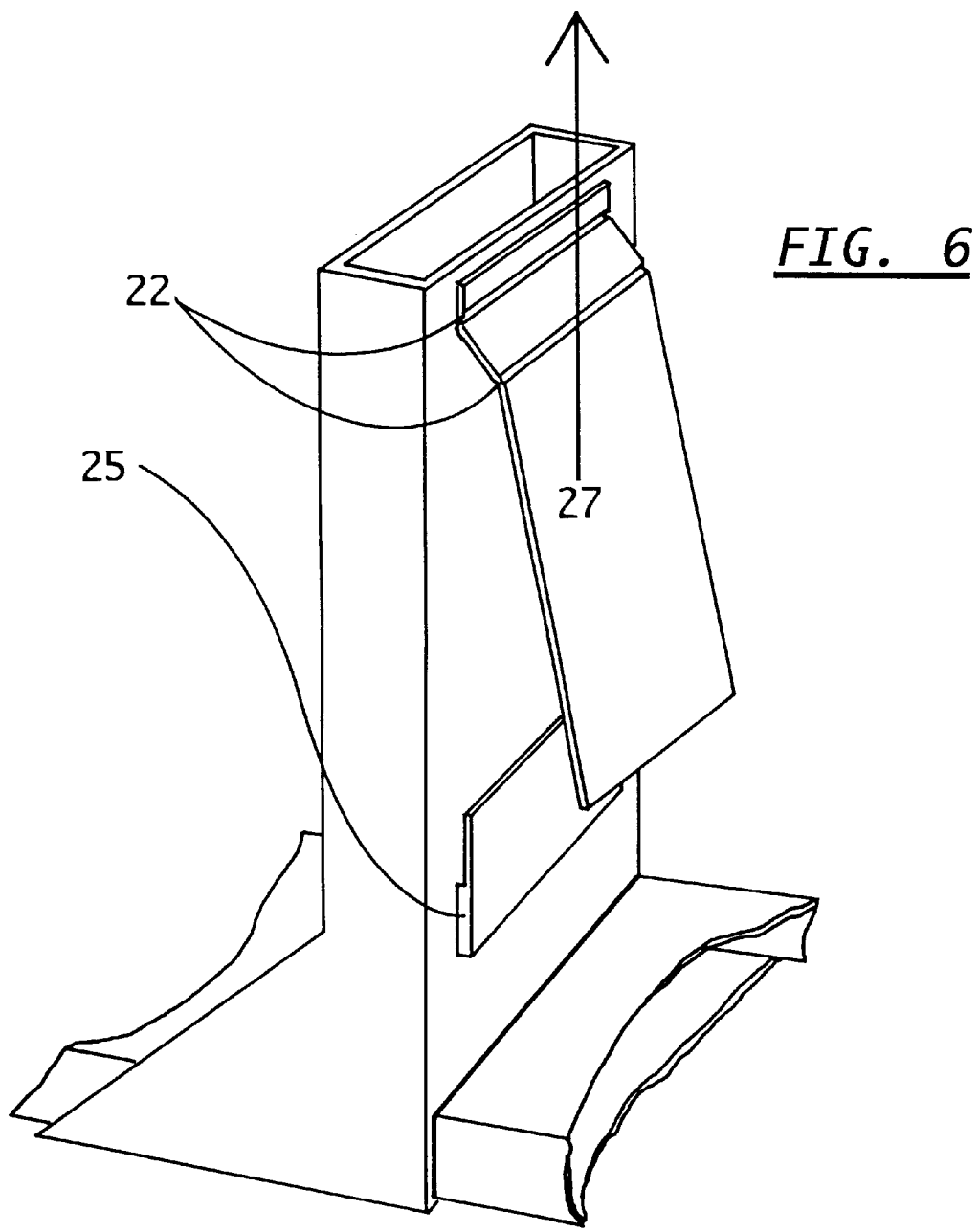
FIG. 6 shows a portion of FIG. 5 illustrating how the tray table-seat back suspension card moves from a position of storage, to a position of deployment.

For further explanation we now turn to FIG. 5., first refering to features of the suspension card assembly in a position stored for transport. Tab 26 permits attachment of the suspension card assembly to the invention by gluing or other means, should the method of manufacture not allow the suspension card assembly to be integrally formed with other parts of the invention. Flexing areas 22 allow the suspension card 20 to be slipped in an upward direction from storing clip 25. FIG. 6 shows the suspension card slipped from the storing clip 25 in an upward direction as indicated by arrow 27. Flexing areas 22 allow the the suspension card to extend upwardly and swing out for deployment.

As mentioned above because the invention does not require a rigid hooking assembly to suspend from the tray table-seat back, several embodiments may be successfully employed to secure the suspension card to the remainder of the invention. Indeed, the following embodiments should not be construed as the only possible suspension means contained within the spirit and scope of this invention.

Figure 9:
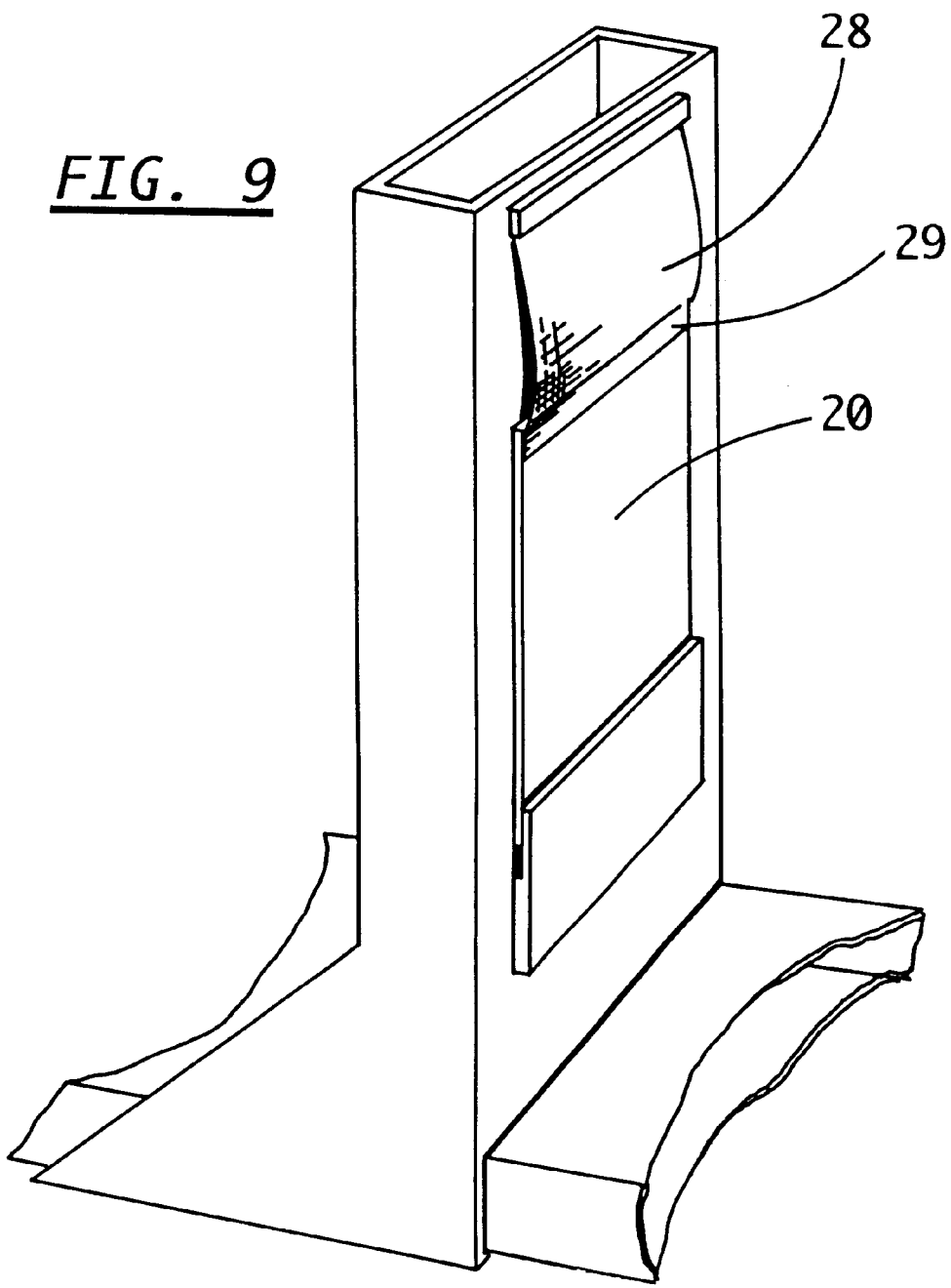
FIG. 9 illustrates another embodiment of the tray table-seat back suspension card where a flexible material is joined between the card and the rest of the invention.

FIG. 9 shows a suspension card assembly utilizing a thin, flexible section of material, such as fabric, 28 attached to the invention and then secured to the suspension card 20 at 29. One advantage of this embodiment is that because this section of material is entirely flexible, it may better accommodate tray tables which have different thicknesses.

Figure 10:
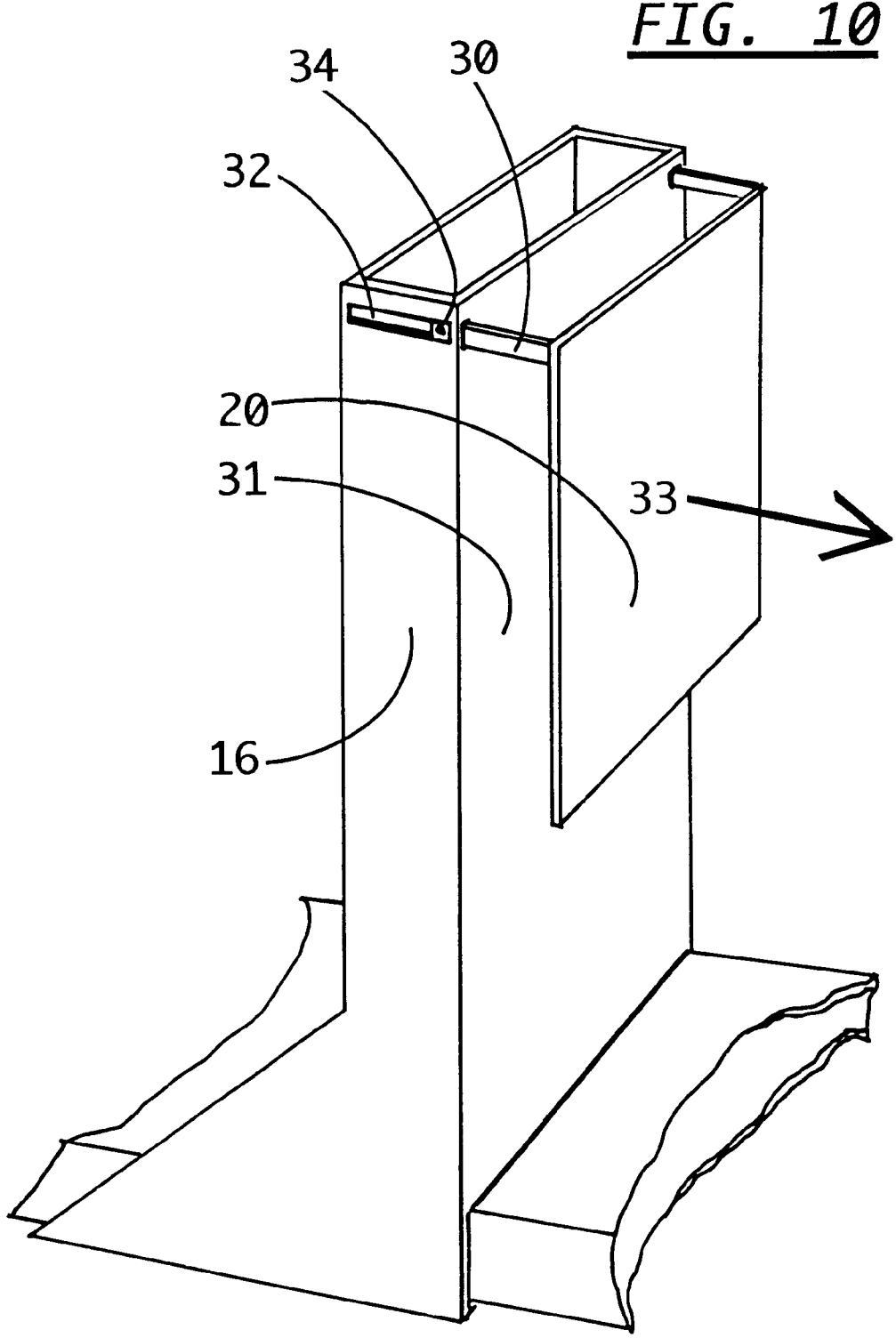
FIG. 10 illustrates another embodiment of the tray table-seat back suspension card in which the card is attached to the invention by members that slide it from a stored to a deployed position.

FIG. 10 shows a suspension card assembly where the suspension card 20 is attached to the invention by sliding arms, identified on one side of the invention at 30. The arms position the suspension card from a stored position against the invention's back at 31, sliding in recessed tract 32 in the direction of arrow 33 to an open position, ready for deployment. A finger gripping means 34 permits the user to slide the suspension card assembly to either the open or stored position.

Figure 11:
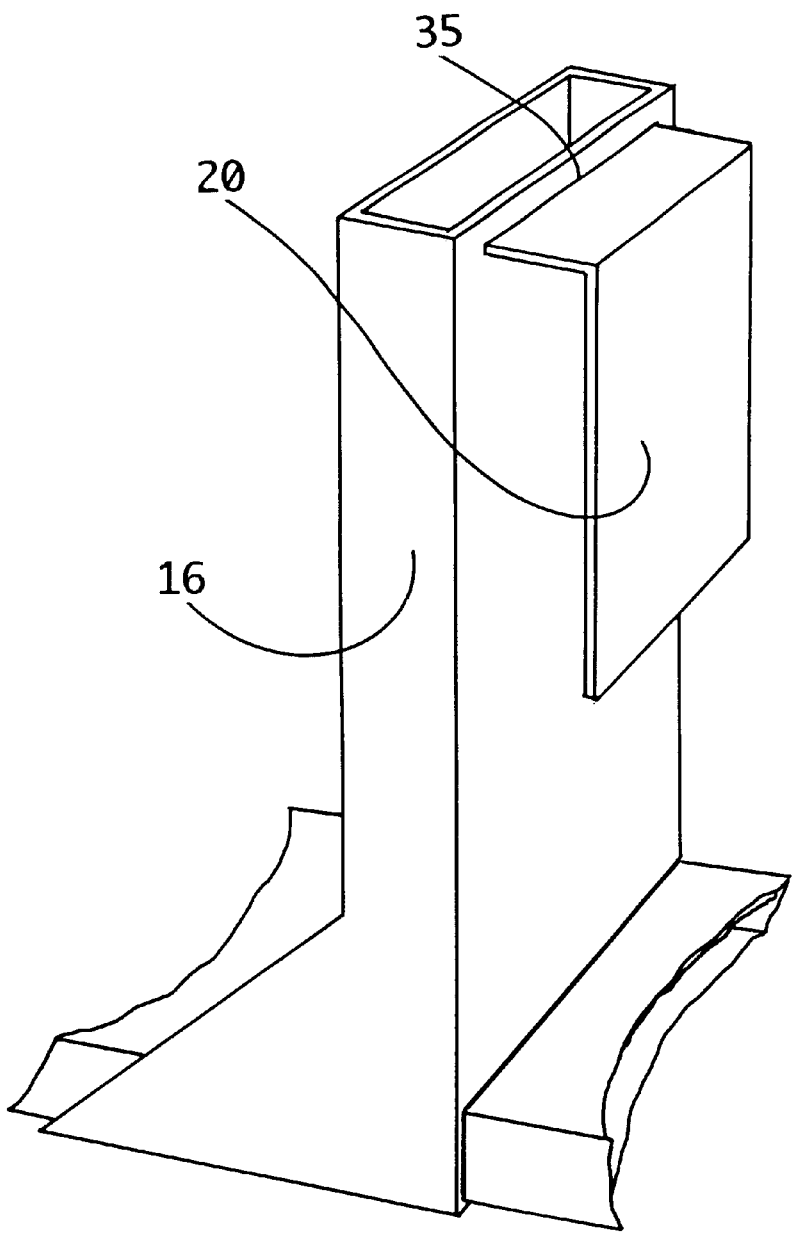
FIG. 11 illustrates a rigid tray table-seat back suspension card attached to the invention and forming a right angle at a spaced, relationship to adequate accommodate the thickness of the tray table.

FIG. 11 illustrates another embodiment of the suspension card assembly. An angular card assembly is formed to or attaches perpendicularly to the invention 16 at 35. This embodiment has a thin suspension card 20, configured so as not to interfere with the closing and locking of the tray table against the seat back, but with sufficient rigidity to maintain its right angle configuration before deployment, while simultaneously having enough flexibility to easily fit over the tray table upper edge.

Now, returning to FIG. 5, In this embodiment the invention consists of two larger interdependent elements: a first vertical member 16 which at its upper portion, supports the suspension card assembly, and at its lower portion provides an aperture 36 sized to closely conform to a second member 19 which is perpendicularly to, and interpenetrates the first member 16. Member 19 is configured to form a shelf, and in this embodiment, further configured to hold a beverage cup in the circular aperture 37 which helps steady and support the cup. A smaller circular aperture 38 provides a finger gripping means for the user, its utility soon to be described at greater length.

In order to maintain a relatively horizontal shelf surface, member 19 may be slid by the user to compensate for seat back adjustment. In case the seat is moved to a more reclining position, member 19 may be moved to compensate for the angular change through aperture 36 in the direction of arrow 39. Conversely member 19 may be moved in the direction of arrow 40 to compensate for a seat adjusted to a more upright position.

Figure 3:
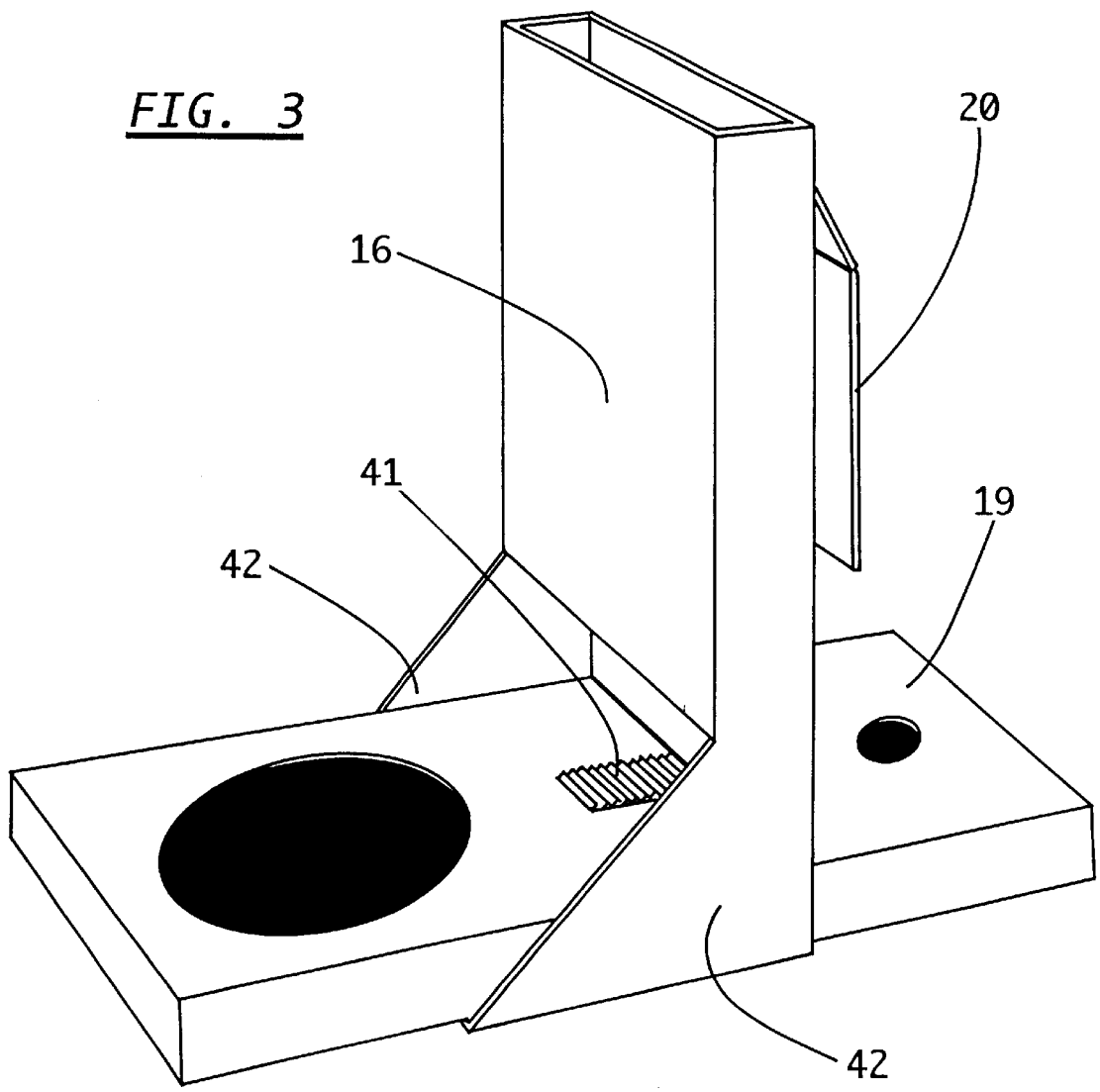
FIG. 3 is an enlarged side view of the invention shown in FIG. 2 illustrating features of the invention.

Referring to FIG. 3, which shows the invention embodiment of FIG. 5, but from a slightly different angle, friction element 41, has been applied to the upper surface horizontal member 19. In this instance the element consists of slightly raised ridges running laterally to the length of member 19. These ridges engage the upper edge of the aperture 36, shown best in FIG. 5. The purpose of this feature is to insure that sufficent force is necessary to change the position of member 19 relative to member 16 so that movement between the two members is deliberate, and applied by the user, rather than accidental, such as by an unwarranted bump.

Again refering to FIG. 3, in order to aid the stability and structural integrity of the shelf formed by member 19, a bracket 42 extend from the sides of 16, and supports the bottom of member 19.

Figure 4:
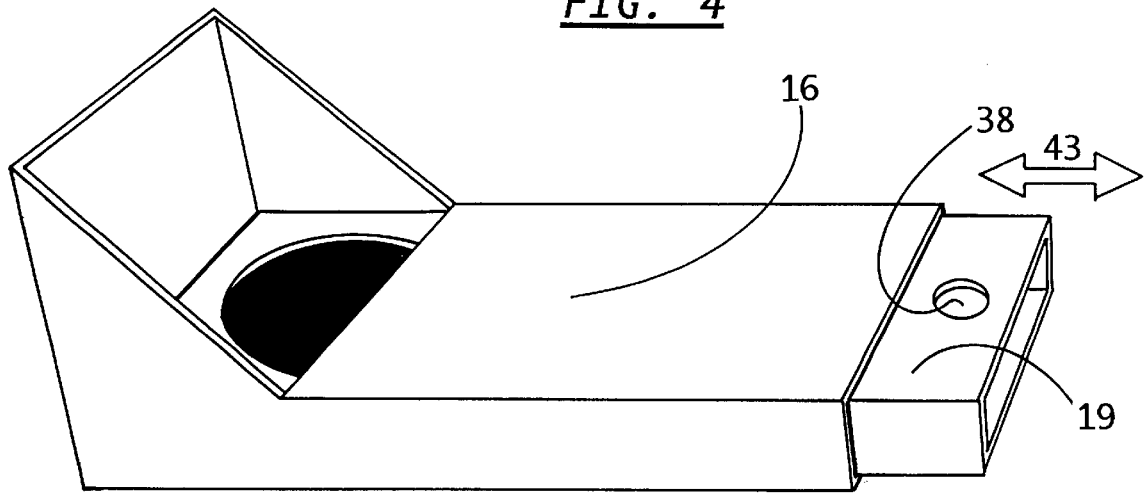
FIG. 4 shows the embodiment of the invention illustrated in FIG. 3 in a position of storage for convenient transport, one section contained within the other.

FIG. 4 shows the invention as embodied in FIG. 3, disassembled and in a configuration for convenient transport. Member 16 is sized slightly larger than member 19, allowing the storage of member 19 within the interior cavity of member 16. A circular aperture 38 located towards one end of 19 provides a finger gripping means for the user, facilitating the sliding removal or placement of member 19 out of, or within member 16 as indicated by double arrow 43.

Figure 12:
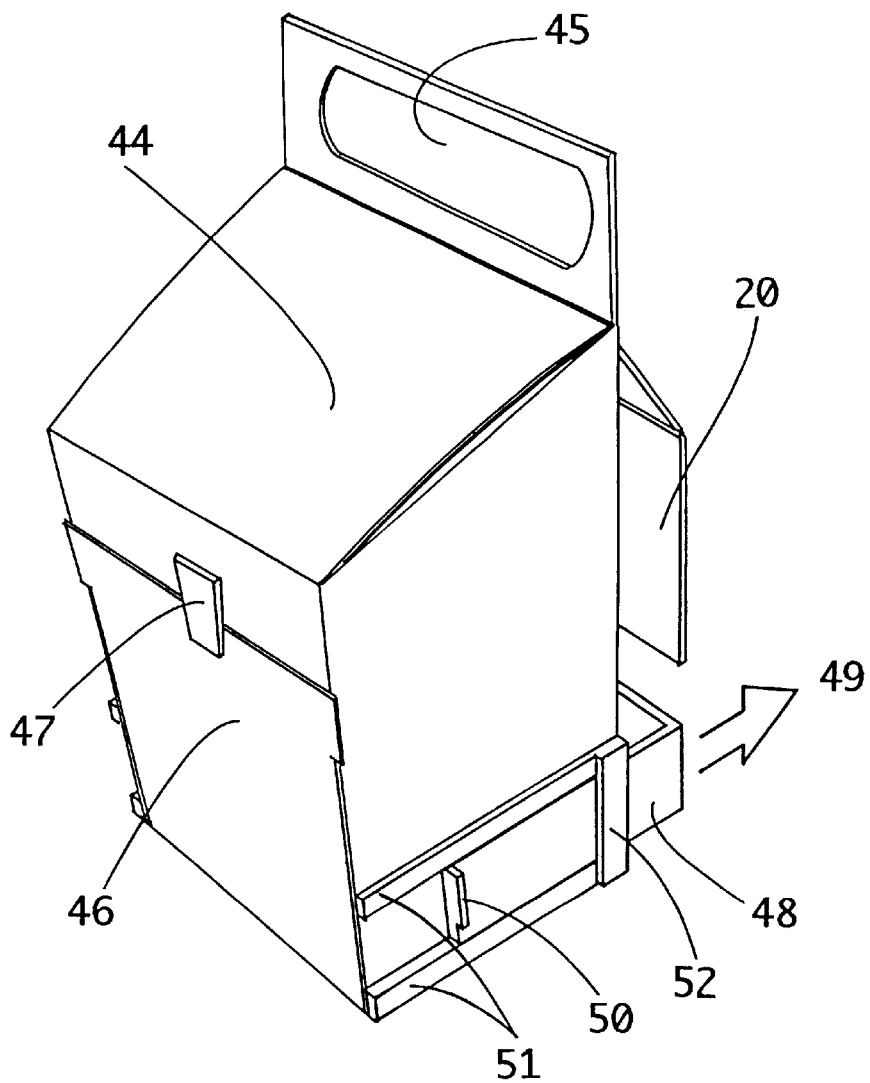
FIG. 12 shows the invention embodied as a container.
Figure 13:
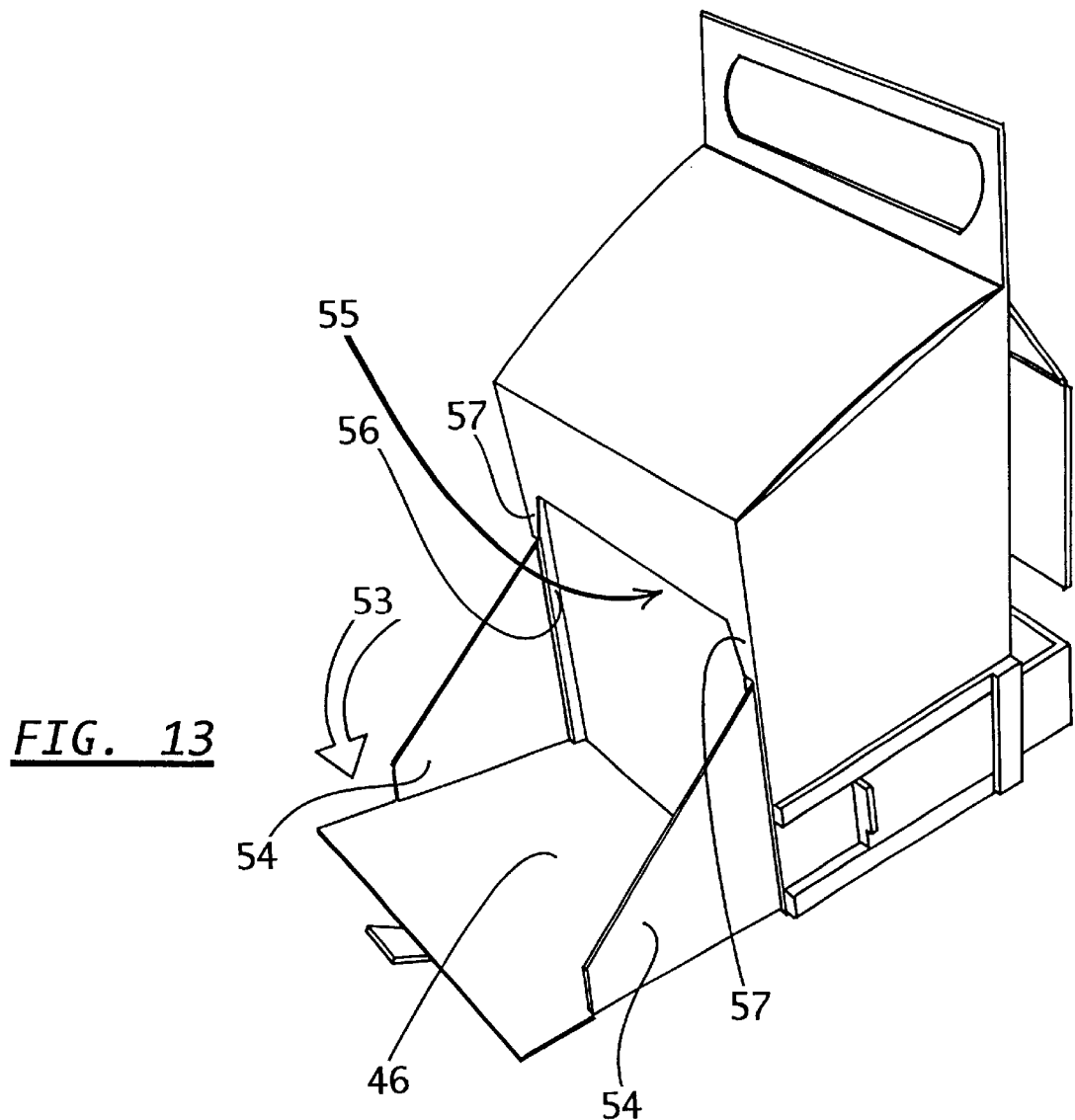
FIG. 13 shows the invention in FIG. 12 with a flap opened to form a shelf convenient to the reach of the user.

Finally, we turn to FIG. 12 and FIG. 13 to discuss an additional embodiment of the present invention.

FIG. 12 shows a container 44 typical of one that might be used to transport sandwiches or fast food. Formed at the upper back of the container is a carrying handle 45 sized to fit conveniently in the user's hand. The suspension card assembly 20 is one of the configurations already discussed. After the container is in the deployed position, a closed front flap 46 faces the seated user. It is secured by a small amount of adhesive to the container front at 47 which also acts as a finger gripping means for the user.

A U shaped extension bracket 48 straddles the bottom of the container on two sides and the back. When the seat holding the invention is reclined, the invention may be repositioned to a more horizontal plane by sliding the U shaped extension bracket towards the seat back in the direction of arrow 49. Finger gripping means 50 assists the user in repositioning the U shaped bracket 48 while guide rails 51 direct the bracket's movement either towards the seat back or towards the user. Cross bar 52 straddles and is attached to the guide rails 51 at the back of the container's sides, serving several purposes; they keep the U bracket assembly linked while allowing free movement of the U bracket 48. They also prevent the U bracket from being dislodged, by serving as a stop against the finger grip means 50, marking the furthest U bracket travel in the direction of the seat back.

A possible third purpose is to provide a surface for friction elements on this embodiment of the invention similar to that described earlier and shown in FIG. 3 at 41.

Now at FIG. 13, front flap 46 has been lowered in the direction of arrow 53, and thus opened to the reach of the user as indicated by arrow 55. Side flaps 54 reinforce and maintain the opened front flap in a horizontal position. Attached to the inner sides of the flaps 54 at the container opening 55 are rigid vertical members shown on one side at 56. When the front flap 46 is in the open position said members extend upwardly inside the front of the container to engage and be restricted by downwardly extending portions of the container front shown on both sides at 57. Such restriction prohibits front flap 46 from moving past the horizontal, and thus presents said flap to the user as a convenient shelf for the contents of the container.

This invention can be manufactured by many methods and of many materials. Some examples include:

An embodiment economically configured to be disposable after only one or several uses. Inexpensive materials may be employed such as paper or plastic products, corrugated board, card stock, wooden crating or straw.

Methods of manufacture might include die stamping from flat stock and either manually or machine folding, gluing or tab insertion. Press molding or vacuum molding are additional options for manufacture.

In an embodiment as rigid or collapsible carry on luggage, the invention may be made of reinforced leather or leather like products. It may also be made of fabric over a flexible or collapsible rigid frame, or of composite materials with separate reinforcing structure, or of plastics or composites which can be formed into rigid configurations.

Other methods of manufacture might include injection molding, or hot vacuum forming.

Having described my invention in detail, it will be apparent to those skilled in the art that numerous modifications can be made without departing from the spirit and scope of the invention, all of which are intended to be claimed.

I claim:

1. A portable shelf sized to hold items such as food, drink, or other items useful to a conveyance passenger, and a suspension means for attachment of said shelf to a tray table and passenger seat back comprising:

a shelf member which is adapted to be suspended from an upper margin of a stored tray table, and having a lower portion employing a shelf dimensioned to position items convenient to the reach of a user, and means for attaching said shelf member to said tray table including a suspension card adapted to be pressed and held in position between said tray table and said seat back while said tray table is in a secured stored position against said seat back, a flexing area means adapted to conform to the thickness of the tray table, one end of the flexing area means being attached to the upper edge of said card, the other end attached to a portion of the shelf member, said shelf member comprising two interdependent members, one of which is a vertical member, which at its upper end is supported by the suspension card, and at its lower end provides an aperture sized to conform to a second member, which in the assembled condition slidably interpenetrates the first vertical member at said aperture.

2. The shelf according to claim 1, wherein the flexing area means is made from flexible material.

3. The flexing area spacing means according to claim 2 wherein the flexible material is dimensioned to accommodate the various thicknesses of different tray tables.

4. The shelf according to claim 1, wherein the second member is essentially a horizontal member forming a tray, the second member interpenetrating the first member and may be urged towards the seat back to compensate horizontally for seat back recline towards the user and away from the seat back to compensate horizontally for the seat returned to an upright position.

5. The shelf according to claim 4, wherein one of said interdependent members slip fits within a cavity of the other interdependent member for convenient transport.

6. The shelf according to claim 1 configured to support a cup convenient to the reach of a user.

7. The shelf according to claim 1 wherein one of said interdependent members slip fits within a cavity of the other interdependent member for convenient transport.

8. A portable container sized to hold items such as food, drink, or other items useful to a conveyance passenger, and a suspension means for attachment of said container to a tray table and passenger seat back comprising:

a container member which is adapted to be suspended from an upper margin of a stored tray table, and having a lower portion employing a shelf dimensioned to position items convenient to the reach of a user, and means for attaching said container member to said tray table including a suspension card adapted to be pressed and held in position between said tray table and said seat back while said tray table is in a secured stored position against said seat back, a flexing area means adapted to conform to the thickness of the tray table, one end of the flexing area means being attached to the upper edge of said card, the other end attached to a portion of the container, said container comprising two interdependent members, one of which is a vertical member, which at its upper end is supported by the suspension card, and at its lower end provides an aperture sized to conform to a second member, which in the assembled condition slidably interpenetrates the first vertical member at said aperture.

9. The container according to claim 8 further comprising a front flap which folds down to form a horizontal shelf, convenient to the reach of the user.

10. The container according to claim 8, wherein the flexing area means is made from flexible material.

11. The flexing area spacing means according to claim 10 wherein the flexible material is dimensioned to accommodate the various thicknesses of different tray tables.

12. The container according to claim 8, wherein the vertical member further comprising a U-shaped extension bracket straddling the container on two sides, the second member interpenetrating the first member through the U-shaped extension bracket and may be urged towards the seat back to compensate horizontally for seat back recline towards the user and away from the seat back to compensate horizontally for the seat returned to an upright position.

13. A portable shelf sized to hold items such as food, drink, or other items useful to a conveyance passenger, and a suspension means for attachment of said shelf to a tray table and passenger seat back comprising:

a shelf member which is adapted to be suspended from an upper margin of a stored tray table, and having a lower portion employing a shelf dimensioned to position items convenient to the reach of a user, and means for attaching said shelf member to said tray table including a suspension card adapted to be pressed and held in position between said tray table and said seat back while said tray table is in a secured stored position against said seat back, a flexing area means adapted to conform to the thickness of the tray table, one end of the flexing area means being attached to the upper edge of said card, the other end attached to a portion of the shelf member, said shelf member comprising two interdependent members, one of which is a vertical member, which at its upper end is supported by the suspension card, and at its lower end provides a bracket sized to conform to a second member, which in the assembled condition can be slidably repositioned within said bracket.

\* \* \* \* \*